(12) United States Patent
Xue et al.

(10) Patent No.: US 9,344,873 B1
(45) Date of Patent: May 17, 2016

(54) LIMITING DATA SERVICE FOR A HOME TERMINAL ROAMING NEAR HOME COVERAGE

(71) Applicant: Sprint Spectrum L.P., Overland Park, KS (US)

(72) Inventors: Wen Xue, Overland Park, KS (US); Lei Zhu, Overland Park, KS (US); Chidambaram C. Pavanasam, Overland Park, KS (US); Saravana Velusamy, Olathe, KS (US); Ramkumar Swaminathan, Olathe, KS (US); Anthony C. Wells, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/739,700

(22) Filed: Jun. 15, 2015

(51) Int. Cl.
*H04W 8/00* (2009.01)
*H04W 36/00* (2009.01)
*H04L 29/06* (2006.01)

(52) U.S. Cl.
CPC .............. *H04W 8/00* (2013.01); *H04L 63/08* (2013.01); *H04L 63/0892* (2013.01); *H04W 36/0011* (2013.01)

(58) Field of Classification Search
CPC ... H04W 88/18; H04W 88/16; H04W 88/005; H04W 8/08; H04W 8/04; H04W 36/0011; H04W 36/0022; H04W 36/14; H04W 76/022; H04W 80/10; H04W 80/045; H04W 80/05; H04W 4/00; H04W 36/00; H04W 80/06; H04L 65/1016; H04L 65/103; H04M 7/1205
See application file for complete search history.

(56) References Cited

U.S. PATENT DOCUMENTS

| | | | |
|---|---|---|---|
| 5,369,681 | A | 11/1994 | Boudreau et al. |
| 5,787,347 | A | 7/1998 | Yu et al. |
| 5,940,743 | A | 8/1999 | Sunay et al. |
| 5,978,463 | A | 11/1999 | Jurkevics et al. |
| 6,069,871 | A | 5/2000 | Sharma et al. |
| 6,091,954 | A | 7/2000 | Haartsen et al. |
| 6,181,945 | B1 | 1/2001 | Lee |
| 6,223,042 | B1 | 4/2001 | Raffel |
| 6,243,590 | B1 | 6/2001 | Reddy et al. |
| 6,438,369 | B1 | 8/2002 | Huang et al. |
| 6,453,162 | B1 | 9/2002 | Gentry |
| 6,556,831 | B1 | 4/2003 | Buppelmann |

(Continued)

FOREIGN PATENT DOCUMENTS

EP     2 244 502     10/2010

OTHER PUBLICATIONS

TIA Standard, "Interoperability Test Specification for cdma2000® Air Interface," TIA-1036, Section 3.11, Jan. 2005.

(Continued)

*Primary Examiner* — Nizar Sivji

(57) ABSTRACT

Disclosed is a method and system to help better manage resources when a mobile terminal is roaming while within a home-carrier coverage hole or while otherwise threshold close to home carrier coverage. In accordance with the disclosure, a mobile terminal's home carrier will determine that the mobile terminal is being served by a roaming carrier's cell site that is threshold close to a home carrier's cell site, and the home carrier will responsively assign to the mobile terminal an IP address that the home carrier is configured to block.

20 Claims, 6 Drawing Sheets

(56) References Cited

U.S. PATENT DOCUMENTS

| | | | |
|---|---|---|---|
| 6,643,520 B1 | 11/2003 | Park et al. | |
| 6,714,789 B1 | 3/2004 | Oh et al. | |
| 6,745,039 B1 | 6/2004 | Di Lalla | |
| 6,922,561 B2 | 7/2005 | Chen et al. | |
| 6,963,750 B1 | 11/2005 | Cheng et al. | |
| 7,065,361 B1 | 6/2006 | Fortuna | |
| 7,072,651 B2 | 7/2006 | Jiang et al. | |
| 7,092,722 B1 | 8/2006 | Oh et al. | |
| 7,110,773 B1 | 9/2006 | Wallace et al. | |
| 7,127,245 B2 | 10/2006 | Almgren | |
| 7,177,658 B2 | 2/2007 | Willenegger et al. | |
| 7,260,415 B1 | 8/2007 | Oh | |
| 7,330,728 B1 | 2/2008 | Moll et al. | |
| 7,349,699 B1 | 3/2008 | Kelly et al. | |
| 7,366,526 B2 | 4/2008 | Zhang et al. | |
| 7,471,656 B2 * | 12/2008 | Karoubalis | H04W 36/0016 370/331 |
| 7,545,761 B1 | 6/2009 | Kalbag | |
| 7,808,942 B2 | 10/2010 | Bui et al. | |
| 8,139,525 B1 | 3/2012 | Vondemkamp et al. | |
| 8,160,619 B1 | 4/2012 | Oroskar et al. | |
| 8,203,963 B1 | 6/2012 | Oroskar et al. | |
| 8,238,906 B1 | 8/2012 | Oroskar et al. | |
| 8,254,920 B1 | 8/2012 | Oroskar et al. | |
| 8,306,558 B1 | 11/2012 | Oroskar et al. | |
| 8,311,536 B1 * | 11/2012 | Pulugurta | H04W 36/0022 455/432.1 |
| 8,355,740 B1 | 1/2013 | Oroskar et al. | |
| 8,359,028 B1 | 1/2013 | Vargantwar et al. | |
| 8,391,858 B1 | 3/2013 | Vargantwar et al. | |
| 8,391,859 B1 | 3/2013 | Pulugurta | |
| 8,452,312 B1 | 5/2013 | Oroskar et al. | |
| 8,457,069 B1 | 6/2013 | Vargantwar et al. | |
| 8,521,195 B1 | 8/2013 | Oroskar et al. | |
| 8,565,759 B1 | 10/2013 | Oroskar | |
| 8,649,807 B1 | 2/2014 | Oroskar et al. | |
| 8,670,788 B1 | 3/2014 | Vargantwar et al. | |
| 8,682,358 B1 | 3/2014 | Shah et al. | |
| 8,825,044 B2 | 9/2014 | Oroskar et al. | |
| 8,873,508 B1 | 10/2014 | Oroskar | |
| 2002/0019228 A1 | 2/2002 | McKenna et al. | |
| 2002/0085517 A1 * | 7/2002 | Lee | H04M 7/006 370/331 |
| 2003/0154307 A1 | 8/2003 | Puthiyandyil et al. | |
| 2004/0037264 A1 | 2/2004 | Khawand | |
| 2004/0097230 A1 | 5/2004 | Natarajan et al. | |
| 2004/0125768 A1 | 7/2004 | Yoon et al. | |
| 2004/0192306 A1 | 9/2004 | Elkarat et al. | |
| 2004/0218558 A1 | 11/2004 | Johansson | |
| 2005/0074015 A1 * | 4/2005 | Chari | H04L 12/2856 370/400 |
| 2005/0128979 A1 * | 6/2005 | Wu | H04L 12/4633 370/331 |
| 2006/0058056 A1 | 3/2006 | Das et al. | |
| 2006/0068778 A1 | 3/2006 | Della-Torre | |
| 2006/0094423 A1 | 5/2006 | Sharma et al. | |
| 2006/0116125 A1 | 6/2006 | Buckley et al. | |
| 2006/0142032 A1 | 6/2006 | Derakhshan et al. | |
| 2006/0142051 A1 | 6/2006 | Purnadi et al. | |
| 2006/0160551 A1 | 7/2006 | Matoba et al. | |
| 2006/0274685 A1 | 12/2006 | Johnson et al. | |
| 2007/0053336 A1 | 3/2007 | Petrovic et al. | |
| 2007/0099644 A1 | 5/2007 | Batra et al. | |
| 2007/0105535 A1 | 5/2007 | Jacobson et al. | |
| 2007/0173252 A1 | 7/2007 | Jiang | |
| 2008/0025235 A1 | 1/2008 | Mahany et al. | |
| 2008/0032713 A1 | 2/2008 | Yang | |
| 2008/0081623 A1 | 4/2008 | Burgan et al. | |
| 2008/0096520 A1 | 4/2008 | Benco et al. | |
| 2008/0293419 A1 | 11/2008 | Somasundaram et al. | |
| 2008/0293437 A1 | 11/2008 | Ranganathan et al. | |
| 2009/0016270 A1 | 1/2009 | Tsirtsis (Georgios) et al. | |
| 2009/0016328 A1 | 1/2009 | Peisa et al. | |
| 2009/0023447 A1 | 1/2009 | Hagerman et al. | |
| 2009/0061854 A1 | 3/2009 | Gillot et al. | |
| 2009/0239531 A1 * | 9/2009 | Andreasen | H04W 8/06 455/433 |
| 2009/0247137 A1 | 10/2009 | Awad | |
| 2009/0285113 A1 | 11/2009 | Yavuz et al. | |
| 2010/0075669 A1 | 3/2010 | Sparks et al. | |
| 2010/0120437 A1 | 5/2010 | Foster et al. | |
| 2010/0202410 A1 * | 8/2010 | Watanabe | H04W 36/02 370/331 |
| 2010/0268674 A1 | 10/2010 | Dwyer et al. | |
| 2010/0311420 A1 | 12/2010 | Reza et al. | |
| 2011/0021197 A1 | 1/2011 | Ngai | |
| 2011/0034167 A1 | 2/2011 | Ben-Shaul et al. | |

OTHER PUBLICATIONS

TR45, "Inter-Operability Specification (IOS) for CDMA 2000 Access Network Interfaces," TIA/EIA/IS-2001-A, Sections 2.2.2.2, 3.4.1, 3.4.3.1.11, and 3.4.9, Jun. 2001.

3rd Generation Partnership Project 2 "3GPP2", "Source-Controlled Variable-Rate Multimode Wideband Speech Codec (VMR-WB), Service Options 62 and 63 for Spread Spectrum Systems," 3GPP@ C.50052-A, Version 1.0, Apr. 22, 2005.

L. Cai et al., "Mitigating DoS Attacks on the Paging Channel by Efficient encoding in Page Messages," In: Proceedings of 5th International ICST Conference on Security and Privacy in Communication Networks (SecureComm 2009), Sep. 2009.

Hasswa et al., "Generic Vertical Handoff Decision Function for Heterogeneous Wireless Networks," IFIP Int. Conf. Wireless and Optical Communication Network (WOCN), pp. 239-243 (Mar. 6, 2005).

NTT DoCoMo, Inc., "IDLE Mode Mobility Control Principles," 3GPP TSG RAN WG2 #59bis; 3GPP Draft; R2-074001, 8 pages, Oct. 8-12, 2007.

NTT DoCoMo, et al., "Load Balancing Solutions for LTE," 3GPP TSG RAN WG2 #58bis; 3GPP Draft; R2-072719, 5 pages, Jun. 22, 2007.

U.S. Appl. No. 12/261,229, filed Oct. 30, 2008.

* cited by examiner

LIMITING DATA SERVICE FOR A HOME TERMINAL ROAMING NEAR HOME COVERAGE

BACKGROUND

Unless otherwise indicated herein, the description provided in this background section is not itself prior art to the claims and is not admitted to be prior art by inclusion in this section.

A wireless communication system provided by a wireless service provider or "carrier" may include one or more cell sites that define coverage in which the carrier may serve mobile terminals such as cell phones, wirelessly-equipped computers, tracking devices, or the like. In particular, the carrier may operate or otherwise provide one or more base stations (also known as access nodes, access points, eNodeBs, and by other names), each having an antenna structure and associated equipment arranged to provide coverage areas such as cells and sectors in which to serve mobile terminals. Each base station may then include or be communicatively linked with network infrastructure that provides connectivity with a packet-switched network such as the Internet.

When a mobile terminal enters into coverage of a carrier's cell site, the mobile terminal may engage in an attachment process through which the terminal registers to be served by the carrier in that cell site. For instance, the mobile terminal may transmit an attach request to the base station of the cell site, and the associated network infrastructure may then authenticate and authorize the mobile terminal for service. Further, as part of this attachment process or as a separate process, the network infrastructure may also assign to the mobile terminal an Internet Protocol (IP) address that the mobile terminal can use to engage in packet-data communication on the packet-switched network. Once the mobile terminal is thus attached and has an assigned IP address, the mobile terminal may then engage use that IP address to communicate via the cell site and network infrastructure with other entities.

In general, a mobile terminal may subscribe to be served by a particular carrier known as the terminal's "home carrier." For instance, an owner or operator of the mobile terminal may enter into a subscription agreement with the carrier, establishing that the carrier will provide the mobile terminal with wireless communication service in exchange for payment of specified fee. When the mobile terminal enters into coverage of a cell site provided by its home carrier, the mobile terminal then attach via that cell site and acquire an IP address to facilitate packet-data communication as noted above. In particular, the mobile terminal may transmit an attach request to the base station of the home carrier's cell site, and network infrastructure operated by the home carrier may then authenticate and authorize the mobile terminal for service. Further, as part of that attachment process or separately, the home carrier's network infrastructure may assign an IP address to the mobile terminal for use by the mobile terminal to engage in packet-data communication. The mobile terminal may then use that assigned IP address to communicate on the packet-switched network, via the home carrier's cell site and the home carrier network infrastructure.

Although a mobile terminal's home carrier may strive to offer wireless coverage throughout a region, however, the home carrier may not actually operate or otherwise provide cell sites in all locations throughout the region. To fill in gaps where the home carrier does not operate or otherwise provide its own cell sites, the home carrier may enter into roaming agreements with other carriers, referred to as "roaming partners" or "roaming carriers." Under a roaming agreement, a roaming carrier may agree to have its cell sites serve the home carrier's subscriber terminals and to provide connectivity with the home carrier's network infrastructure so that the home carrier can authenticate and authorize the subscriber terminals and the home carrier's network infrastructure can provide the subscriber terminals with packet-data network connectivity. In accordance with the roaming agreement, the roaming carrier may then report such usage to the home carrier and may charge the home carrier for the usage. And the home carrier may pass that charge along to the service accounts of the subscriber terminals.

With such an arrangement, when a mobile terminal enters into coverage of a roaming carrier's cell site, the mobile terminal may attach via that roaming carrier's cell site and may then engage in packet data communication served by the home carrier. In particular, the mobile terminal may transmit an attach request to the roaming carrier's cell site, and, because the mobile terminal is a subscriber of the home carrier, the roaming carrier's network infrastructure may responsively signal to the home carrier's network infrastructure. The home carrier's network infrastructure may then authenticate and authorize the mobile terminal for service and, as part of that attachment process or separately, may assign an IP address to the mobile terminal for use by the mobile terminal to engage in packet-data communication. And the mobile terminal may then use that home-carrier assigned IP address to communicate on the packet-switched network, via the roaming carrier's cell site and the home carrier network infrastructure.

OVERVIEW

As a general matter, a home carrier may prefer to have its subscribers operate in coverage of the home carrier's network, rather than in coverage of a roaming carrier's network. One reason for this is that the home carrier will typically profit more when the home carrier charges the subscriber for use of the home carrier's network and services than when the home carrier merely passes a roaming carrier's charges along to the subscriber. Further, another reason is that, when a subscriber is roaming, the subscriber may not benefit from full access to the home carrier's services and support, which may lead to poor user experience.

The choice of operating in home network coverage or roaming network coverage becomes an issue in a region where both home network coverage and roaming network coverage are provided. Throughout such a region, there may be some areas where the home carrier provides coverage and other areas where the home carrier does not provide coverage but a roaming carrier provides coverage, and there may be areas where both the home carrier and a roaming carrier provide coverage. A specific example of this is a region where a home carrier has built out its network with cell sites providing seamless coverage in most of the region but where there are some gaps or holes in that home coverage, and where the roaming carrier provides one or more cell sites that fill in those coverage holes.

In such an arrangement, a mobile terminal may be close to coverage of its home network, but because it is in a home-carrier coverage hole, the mobile terminal may attach with the roaming carrier's network. For the reasons noted above, that result is undesirable.

One way to overcome this problem is to prevent the mobile terminal from attaching via the roaming carrier's network in the first place, when the mobile terminal is in a coverage hole of the home carrier's network. For instance, the home carrier's network infrastructure could be configured to detect that a mobile terminal is attempting to attach via a roaming carrier's cell site at a location where the home carrier provides nearby coverage, and to responsively deny authorization for the mobile terminal to be served, so as to prevent roaming. This solution could be deemed acceptable on grounds that the mobile terminal is near home carrier coverage and that the mobile terminal may therefore soon attach with the home carrier's network instead.

A problem with such a solution, however, is that it may cause the mobile terminal to repeatedly try attaching via the roaming carrier's cell site. In particular, when the mobile terminal seeks to attach via the roaming carrier's cell site and the home carrier denies authorization for service, the mobile terminal may then search for coverage, once again find coverage of the roaming carrier's cell site, and repeat the process. Repetition of this process, however, may undesirably burden the roaming carrier's network infrastructure, the home carrier's network infrastructure, and the mobile terminal's battery life. Therefore, an improvement is desired.

Disclosed herein is a method and system to help better manage resources when a mobile terminal is roaming while within a home-carrier coverage hole or while otherwise threshold close to home carrier coverage. In accordance with the disclosure, a mobile terminal's home carrier will determine that the mobile terminal is being served by a roaming carrier's cell site that is threshold close to a home carrier's cell site, and the home carrier will responsively assign to the mobile terminal an IP address that the home carrier is configured to block.

By assigning an IP address to the roaming mobile terminal, the home carrier may enable the mobile terminal to be served by the roaming carrier, by causing the mobile terminal to perceive that IP address acquisition was successful. But by assigning to the mobile terminal an IP address that the home carrier is configured to block, the home carrier can advantageously prevent packet-data communication to or from that IP address while the mobile terminal is served by the roaming carrier, and thereby help to minimize roaming charges. Further, this solution, like that discussed above, could be deemed acceptable on grounds that the mobile terminal is near home carrier coverage and that the mobile terminal may therefore soon transition to be served by a home carrier cell site instead.

Accordingly, in one respect, disclosed is a method of limiting data service for a mobile terminal that subscribes to service of a home carrier but that is served by a roaming carrier while near coverage provided the home carrier. In accordance with the method, the home carrier determines that the mobile terminal is being served by a cell site of the roaming carrier and that the cell site of the roaming carrier is located within a threshold distance of a cell site of the home carrier. In turn, the method then involves the home carrier responsively assigning to the mobile terminal an IP address that the home carrier is configured to block.

In another respect, disclosed is a method of controlling data service for mobile terminals that subscribe to service of a home carrier. In accordance with the method, the home carrier may receive a signaling message indicative of attachment of one of the mobile terminals with a cell site, and, in response to the signaling message, the home carrier may make a determination of whether (i) the cell site is of a roaming carrier rather than of the home carrier and (ii) the cell site is located within a threshold distance of a cell site of the home carrier. Based on the determination, the home carrier may then select and assign to the mobile terminal an IP address. In particular, if the determination is affirmative, then the home carrier may select and assign to the mobile terminal an IP address from a pool of IP addresses that the home carrier is configured to block, but if the determination is negative, then the home carrier may select and assign to the mobile terminal an IP address from a default pool of IP addresses rather than from the pool of IP addresses that the home carrier is configured to block.

Further, in still another respect, disclosed is a policy server that is configured to control data service for mobile terminals that subscribe to service of a home carrier. In accordance with the disclosure, the policy server may include a network communication interface, a processing unit, data storage, and program instructions stored in the data storage and executable by the processing unit to carry out operations of the methods disclosed. For instance, the instructions may be executable to receive via the network communication interface a signaling message indicative of attachment of one of the mobile terminals with a cell site, to respond to the signaling message by making a determination of whether (i) the cell site is of a roaming carrier rather than of the home carrier and (ii) the cell site is located within a threshold distance of a cell site of the home carrier, and, based on the determination, to cause the home carrier to select and assign to the mobile terminal an IP address as discussed above.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
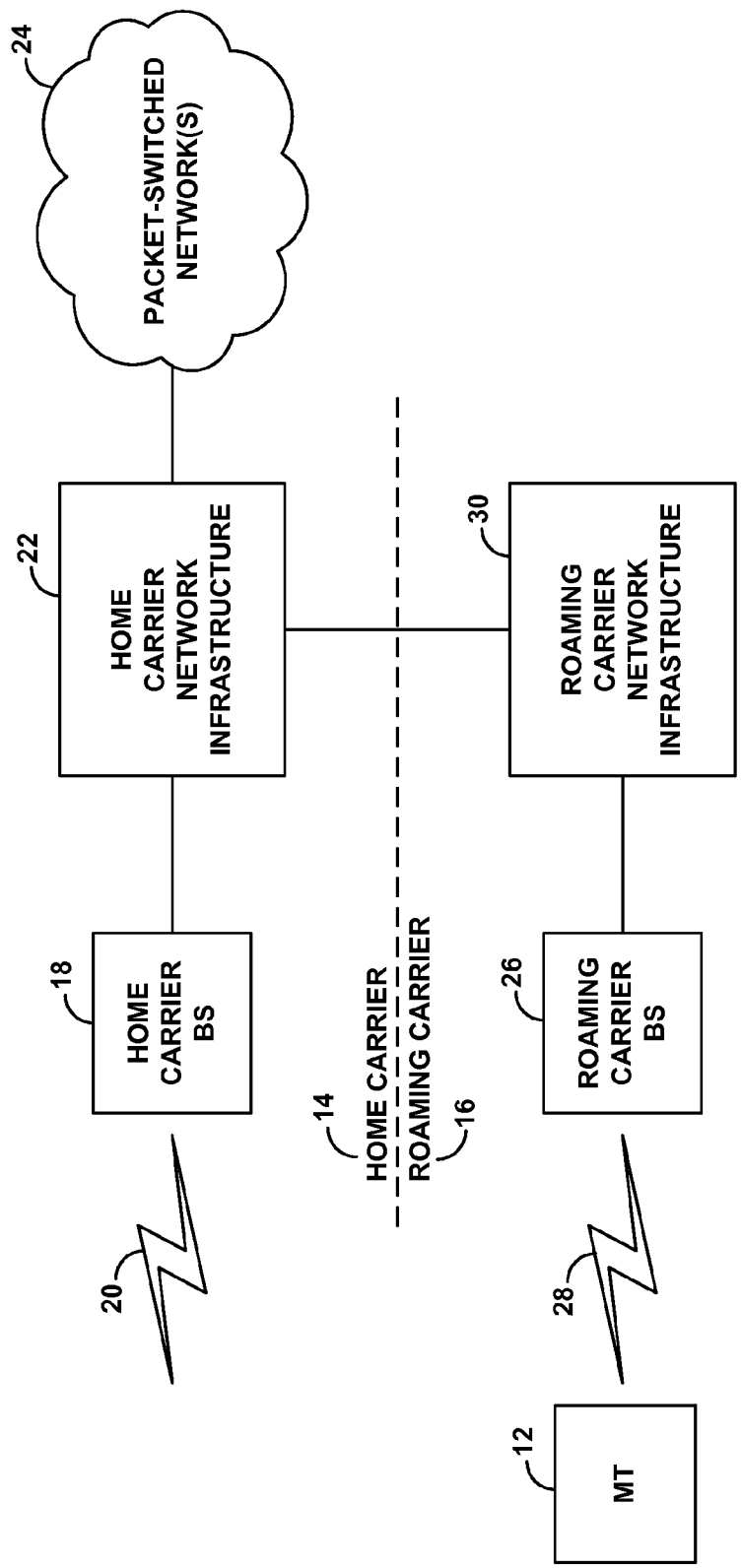
FIG. 1 is a simplified diagram of an arrangement in which features of the present disclosure can be implemented.

Referring to the drawings, as noted above, FIG. 1 is a simplified diagram of an arrangement in which features of the present disclosure can be implemented. As shown, the arrangement includes a mobile terminal 12, a home carrier system 14, and a roaming carrier system 16. Consistent with the discussion above, the home carrier system 14 includes a representative home carrier base station 18, which radiates to provide a home carrier coverage area 20, and representative home carrier network infrastructure 22, which provides connectivity with one or more packet-switched networks 24. Further, the roaming carrier system 16 includes a representative roaming carrier base station 26, which radiates to provide a roaming carrier coverage area 28, and representative roaming carrier network infrastructure 30 (which, though not shown, may also provide connectivity with the packet-switched network(s) 24). In addition, as shown, the roaming carrier network infrastructure 22 is communicatively linked with the home carrier network infrastructure 26, to facilitate exchange of control and bearer data between the carriers' networks.

In this arrangement, we assume that the home carrier system 14 is provided by a home carrier, the roaming carrier system 16 is provided by a roaming carrier that has a roaming agreement with the home carrier, and the mobile terminal 12 subscribes to service of the home carrier. Further, we assume that the mobile terminal is currently not within any coverage of the home carrier system (including coverage of home carrier base station 22) that is sufficiently strong to trigger attachment with the home carrier. However, we assume that the mobile terminal is within sufficiently strong coverage of roaming carrier base station 26 to trigger attachment with that roaming carrier base station 26.

With such an arrangement, as described above, the mobile terminal may transmit an attach request over the air to the roaming carrier base station 26, which may trigger signaling to the roaming carrier network infrastructure 30 and in turn to the home carrier network infrastructure 22. The home carrier network infrastructure 22 may then authenticate and authorize the mobile terminal for service. Further, the home carrier network infrastructure 22 may assign an IP address for use by the mobile terminal to communicate on the packet-switched network. In practice, the home carrier network infrastructure 22 may select this IP address from a default pool of IP addresses available for assignment to mobile terminals and may direct use of the selected IP address by the mobile terminal.

Upon thus becoming attached via the roaming carrier base station 26 and being assigned an IP address by the home carrier network infrastructure 22, the mobile terminal may then use the assigned IP address to engage in packet-data communication on the packet-switched network via a path that extends via the roaming carrier base station 26, the roaming carrier network infrastructure 30, and the home carrier network infrastructure 22.

As discussed above, the present disclosure provides for limiting data service for a mobile terminal that is roaming near coverage of a home cell site, by allowing such a mobile terminal to be served by the roaming carrier but assigning to the mobile terminal an IP address that the home carrier is configured to block.

In the arrangement of FIG. 1, for instance, when mobile terminal 12 seeks to attach via the roaming carrier base station 26 and associated signaling therefore passes to the home carrier network infrastructure 22, the home carrier network infrastructure 22 may authenticate and authorize the mobile terminal for service. Further, in that attachment process or perhaps in response to a related request for assignment of an IP address to the mobile terminal, the home carrier network infrastructure 22 will assign an IP address to the mobile terminal. But in doing so, the home carrier network infrastructure 22 will determine that the mobile terminal is being served by a roaming carrier's cell site (e.g., is attached via the roaming carrier's cell site or is attempting to so attach) and that the roaming carrier's cell site is threshold close to a cell site of the home carrier, and the home carrier network infrastructure 22 will responsively select as the IP address to assign to the mobile terminal an IP address that the home carrier is configured to block. As a result, although the mobile terminal will thus be attached via the roaming carrier cell site and will have an assigned IP address, the home carrier may then block IP communication to and from that address, thus helping to minimize roaming charges.

This process can apply in any of a variety of specific network configurations. Two examples will be discussed next, by reference to FIGS. 2 and 3. But it will be understood that numerous variations are possible, both within the specifics of the arrangements discussed and generally allowing for other network arrangements and processes.

Figure 2:
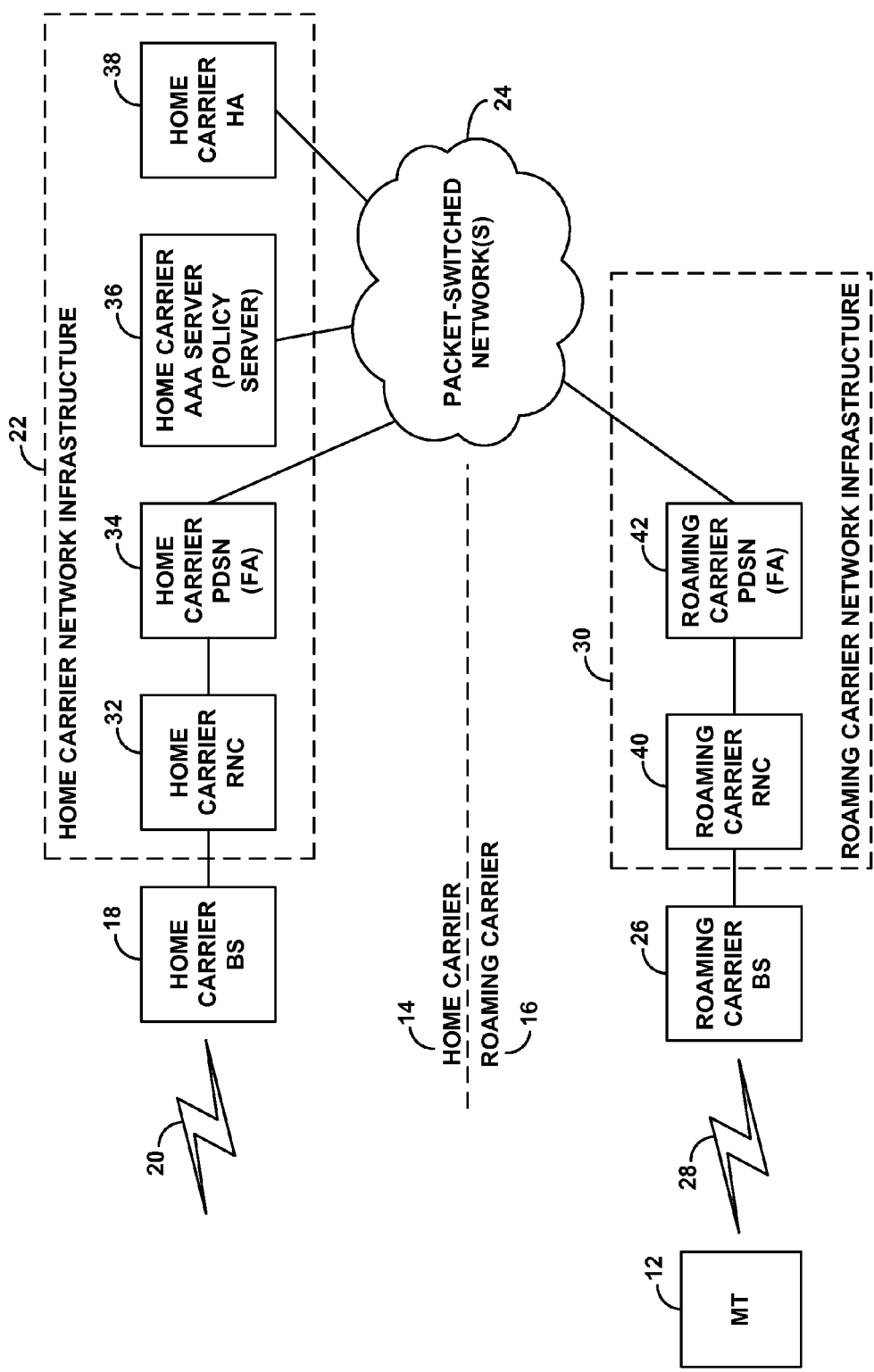
FIG. 2 is a simplified block diagram of an example network arrangement.

FIG. 2 depicts an example "3G" network arrangement. In this example arrangement, the home carrier base station 18 and roaming carrier base station 26 may be base transceiver stations (BTSs), access nodes (ANs), NodeBs, or the like, and the home carrier coverage area 20 and roaming carrier cover area 28 may each be compliant with an air interface protocol such as Code Division Multiple Access (CDMA) or Global System for Mobile Communication (GSM), for instance. The home carrier network infrastructure 22 then includes a radio network controller (RNC) 32 that controls aspects of home carrier base station operation, a packet data serving node (PDSN) 34 that provides connectivity with one or more packet-switched network(s) 24, an authentication, authorization, and accounting (AAA) server 36 that functions as a policy server, and a Mobile-IP home agent (HA) 38 that provides IP address assignment. Further, the roaming carrier network infrastructure 30 likewise includes an RNC 40 that controls aspects of roaming carrier base station operation, and a PDSN 42 that provides connectivity with the packet-switched network(s) 24.

With this arrangement, when mobile terminal 12 does not detect sufficient home carrier coverage but detects sufficient coverage of roaming carrier base station 26, the mobile terminal may transmit an access request or connection request over the air to the roaming carrier base station 26, which the roaming carrier base station 26 may forward to the roaming carrier RNC 32. The roaming carrier RNC 40 may then direct the roaming carrier base station 26 to establish a radio-link layer connection over the air interface with the mobile terminal, and the roaming carrier base station 26 may do so.

Provided with that radio-link layer connection, the mobile terminal may then engage in signaling with the roaming carrier PDSN 42 to establish a data-link layer connection. In particular, the mobile terminal may transmit via the roaming carrier base station 26 to the roaming carrier RNC 40 a request to establish a point-to-point protocol (PPP) session with the roaming carrier PDSN 42, and the roaming carrier RNC 40 would send an associated registration request to the roaming carrier PDSN 42. This PPP session request and associated registration request may carry an identifier of the mobile terminal, such as a network access identifier, which also indicates the mobile terminal's home carrier. Based on that identifier or other data, the roaming carrier PDSN 42 may therefore signal to the mobile terminal's home carrier AAA server 36 for authorization. Thus, the roaming carrier PDSN 42 may transmit a RADIUS request to the home carrier AAA server 36 seeking authorization to serve the mobile terminal. Upon successful authorization, signaling may then pass back to the roaming carrier PDSN 42 and ultimately to the mobile terminal to complete data-link layer establishment.

Having an established radio-link layer connection with the roaming carrier base station 26 and a data-link layer connection with the roaming carrier PDSN 42, the mobile terminal may then engage in signaling to establish a network-layer connection through which to engage in communication on the packet-switched network(s) 24. In particular, the mobile terminal may transmit to the roaming carrier PDSN 42 a Mobile-IP registration request destined to the home carrier HA 38, and the roaming carrier PDSN 42, acting as a Mobile-IP foreign agent (FA), may forward that request to the home carrier HA 38. The home carrier HA 38 may then select an IP address to assign to the mobile terminal, record a binding between that selected IP address and a care-of address (such as an IP address of the roaming carrier PDSN 42), and send a reply to the mobile terminal specifying the assigned IP address.

Provided with the assigned IP address, the mobile terminal may then use that IP address to engage in communication on the packet-switched network(s) 24. In particular, the mobile terminal may transmit packet-data from that IP address to a destination IP address, and that packet-data may flow via the roaming carrier base station 26, the roaming carrier RNC 40, and the roaming carrier PDSN 42 to the home carrier HA 38 and via the packet-switched network(s) 42 to its destination. Further, when another party transmits data to the mobile terminal's assigned IP address, that data may flow over the packet-switched network(s) 24 to the home carrier HA 38, and the home carrier HA 38 may forward that data to the roaming carrier PDSN 42 for transmission via the roaming carrier RNC 40 and roaming carrier base station 26 to the mobile terminal.

In accordance with the present disclosure, the home carrier AAA server 36 in this arrangement can function as a policy server, to cause the home carrier HA 38 to assign to the mobile terminal an IP address that the home carrier is configured to block, in a situation where the mobile terminal is served by a roaming carrier cell site that is threshold close to home carrier coverage.

To facilitate this in an example implementation, the AAA server 36 may include or otherwise have access to data that indicates for each of a plurality of roaming carrier cell sites (e.g., base stations and/or their associated coverage range) whether the roaming carrier cell site is within a threshold distance from home carrier coverage. Such data could be established through engineering input or otherwise based on geographic location of various roaming carrier cell sites and home carrier cell sites, with the threshold distance being a distance of about three miles (e.g., a distance in the range of one mile to five miles) and could take various forms. For instance, the data could list roaming carrier cell sites by cell-site identifier (e.g., base station identifier) and, for each roaming carrier cell site provide a Boolean indication of whether the roaming carrier cell site is within the threshold distance of home carrier coverage. Alternatively, the data could specify a geographic location of each roaming carrier cell site and could specify geographic scope of home carrier coverage.

Further, when the roaming carrier RNC 40 signals to the roaming carrier PDSN 42 for the mobile terminal (e.g., when the mobile terminal is seeking to establish a data-link layer connection), the RNC 40 may include in the signaling an identifier of the roaming carrier base station 26 at issue. And the roaming carrier PDSN 42 may pass that roaming carrier base station identifier along in its RADIUS request to the home carrier AAA server 36.

Upon receipt of that signaling from the roaming carrier PDSN 42, the home carrier AAA server 36 may determine that the mobile terminal is roaming by the fact that the RADIUS request comes from a PDSN IP address of a roaming carrier. Alternatively, the home carrier AAA server 36 may be one specifically provided by the home carrier for serving roaming carriers, in which case the fact that that is the AAA server at issue may implicitly amount to a determination that the mobile terminal at issue is roaming. Further, the home carrier AAA server 36 may read the roaming carrier cell-site identifier from the RADIUS message and may perform a lookup in the coverage data discussed above, to determine whether the roaming carrier cell site serving the mobile terminal is threshold close to home carrier coverage.

If the home carrier AAA server 36 thereby determines that the mobile terminal is being served by a roaming carrier cell site that is threshold close to home carrier coverage, then the home carrier AAA server 36 may in turn send a RADIUS message to the home carrier HA 38 directing the home carrier HA 38 to assign to the mobile terminal an IP address that the home carrier is configured to block. Consequently, when the home carrier HA 38 receives from the mobile terminal a Mobile-IP registration request, the home carrier HA 38 may responsively assign to the mobile terminal an IP address that the home carrier is configured to block.

This is to be contrasted with a situation where the home carrier AAA server 36 receives such signaling for a mobile terminal that is served by a home carrier base station or that is served by a roaming carrier base station that is not threshold close to home carrier coverage. In that situation, the AAA server 36 may not send any special directive to the home carrier HA 38 or may specifically direct the home carrier HA 38 to assign to the mobile terminal a normal, default IP address. Thus, when the home carrier HA 38 receives from the mobile terminal a Mobile-IP registration request, the home carrier HA 38 may then assign to the mobile terminal an IP address that the home carrier is not configured to block.

To facilitate this further, the home carrier HA 38 may include or have access to multiple pools of IP addresses, including one or more default pools of IP addresses and one or more pools of IP addresses that the home carrier HA is set to block. In particular, the home carrier HA 38 may be programmed with different access control logic for these pools of IP addresses. For each default pool of IP addresses, the access control logic may not provide for blocking of communication (or may provide for a limited first extent of blocking), whereas for each pool of IP addresses to be blocked, the access control logic may provide that the home carrier HA 38 should prevent outbound and/or inbound communication from such IP addresses (e.g., complete blocking or a more extensive second extent of blocking). In either case, there may be exceptions for emergency calling and the like.

Thus, with the present process, in response to determining that the mobile terminal is being served by a roaming carrier cell site and that the roaming carrier cell site is located within a threshold distance of home carrier coverage (e.g., of a base station or of base station coverage provided by the home carrier), the home carrier HA 38 may assign to the mobile terminal an IP address that the home carrier is configured to block, and the home carrier HA 38 may accordingly block data communication to and/or from that IP address. Advantageously with this arrangement, as noted above, the mobile terminal would thus still be able to be served by the roaming carrier, but the home carrier could prevent IP communication to and from the mobile terminal during that service.

Figure 3:
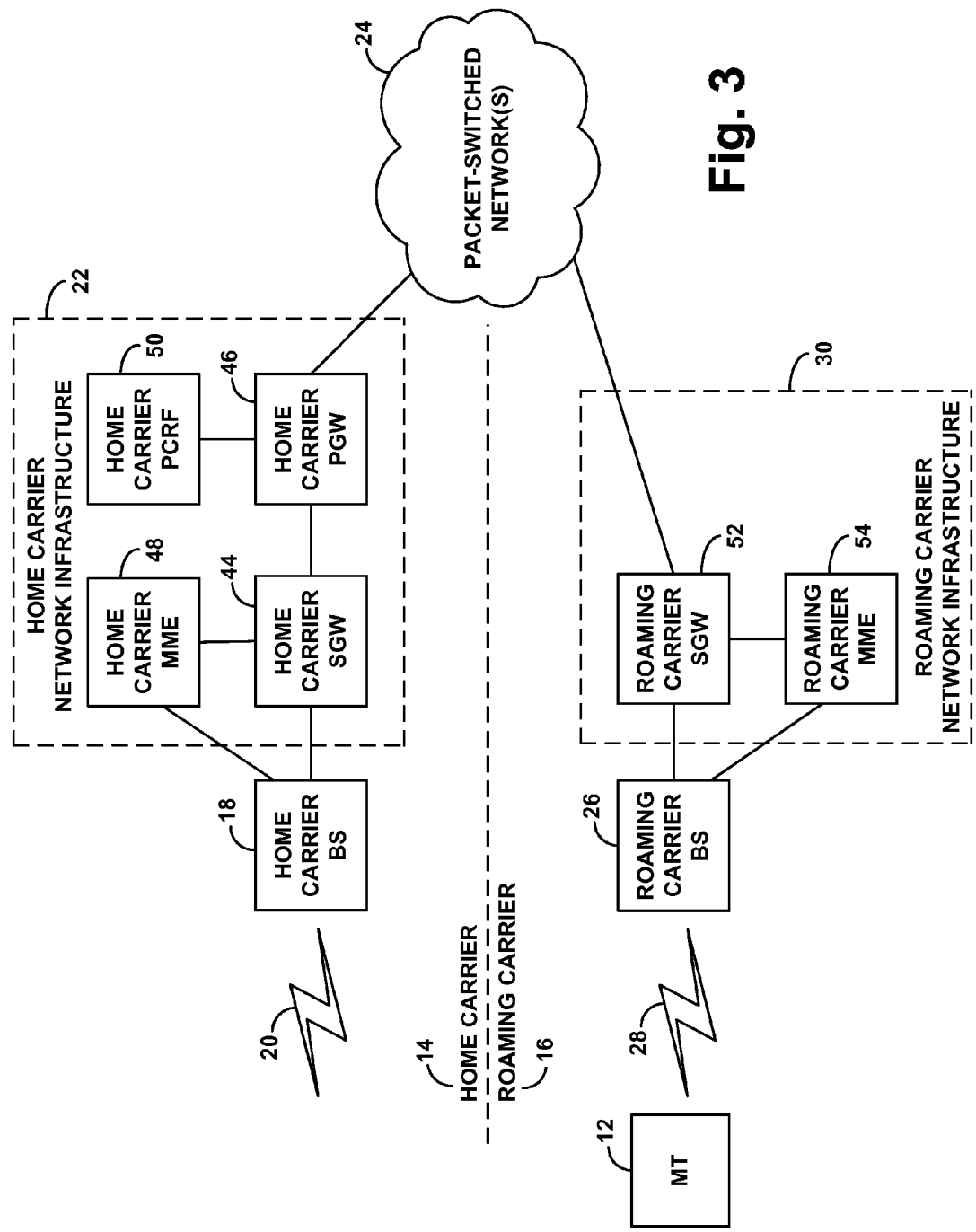
FIG. 3 is a simplified block diagram of another example network arrangement.

FIG. 3 next depicts an example "4G" network arrangement. In this example arrangement, the home carrier base station 18 and roaming carrier base station 26 may be evolved Node-Bs (eNodeBs) or the like, and the home carrier coverage area 20 and roaming carrier cover area 28 may each be compliant with an air interface protocol such as Long Term Evolution (LTE) (an Orthogonal Frequency Division Multiple Access (OFDMA) protocol). The home carrier network infrastructure 22 then includes a serving gateway (SGW) 44 interfaced with the home carrier base station 18, a packet data network gateway (PGW) 46 interfaced with the SGW and providing connectivity with the packet-switched network(s) 24, a mobility management entity (MME) 48 interfaced with the SGW 44 and with the home carrier base station 18, and a policy and charging rules function (PCRF) 50 interfaced with the PGW 46 and functioning as a policy server. Further, the roaming carrier network infrastructure 30 likewise includes an SGW 52 and an MME 54.

With this arrangement, when mobile terminal 12 does not detect sufficient home carrier coverage but detects sufficient coverage of roaming carrier base station 26, the mobile terminal may transmit to the roaming carrier base station 26 an attach request, including an identifier of the mobile terminal (e.g., international mobile subscriber identity (IMSI)) and an identifier of the mobile terminal's home carrier (e.g., public land mobile network (PLMN) identifier (H-PLMN ID), which the roaming carrier base station 26 may pass to the roaming carrier MME 54. The roaming carrier MME 54 may then responsively transmit to the roaming carrier SGW a create_session request, including the mobile terminal provided information as well as a global identifier of the roaming carrier cell site that incorporates both an identifier of the roaming carrier (e.g., visited PLMN ID (V-PLMN ID)) and a cell-site ID.

Based on the included information indicating that this is a roaming mobile terminal, the roaming carrier SGW 52 may then responsively transmit a corresponding create_session request to the mobile terminal's home carrier PGW 46, similarly including the mobile terminal provided information and the global cell identifier. In turn, the home carrier PGW 46 may then send to the home carrier PCRF 50 a DIAMETER message that similarly includes the mobile terminal provided information and the global cell identifier and that seeks authorization and an indication of any applicable policy rules. And the home carrier PCRF 50 may then respond to the home carrier PGW 46 with a directive for the home carrier PGW 46 to assign an IP address to the mobile terminal. Thus, the home carrier PCRF 50 may select an IP address to assign to the mobile terminal, record a binding between that IP address and the mobile terminal, and send to the roaming carrier SGW 52 a create_session response specifying the assigned IP address. The roaming carrier SGW 52 may then signal in turn to the roaming carrier MME 54, which may signal in turn to the roaming carrier base station 26, which may signal in turn to the mobile terminal, providing the mobile terminal with the assigned IP address.

Provided with this assigned IP address, the mobile terminal may then use the IP address to engage in communication on the packet-switched network(s) 24. In particular, the mobile terminal may transmit packet-data from that IP address to a destination IP address, and that packet-data may flow via the roaming carrier base station 26 and the roaming carrier SGW 52 to the home carrier PGW 46 and via the packet-switched network(s) 42 to its destination. Further, when another party transmits data to the mobile terminal's assigned IP address, that data may flow over the packet-switched network(s) 24 to the home carrier PGW 46, and the home carrier PGW 46 may forward that data to the roaming carrier SGW 52 for transmission via the roaming carrier base station 26 to the mobile terminal.

In accordance with the present disclosure, in this arrangement, the home carrier PCRF 50 can function as a policy server, to cause the home carrier PGW 46 to assign to the mobile terminal an IP address that the home carrier is configured to block, in a situation where the mobile terminal is served by a roaming carrier cell site that is threshold close to home carrier coverage.

To facilitate this in an example implementation, the home carrier PCRF 50 may include or otherwise have access to data like that discussed above, indicating for each of a plurality of roaming carrier cell sites whether the roaming carrier cell site is within a threshold distance from home carrier coverage.

Upon receipt of the DIAMETER message from the home carrier PGW 46, the home carrier PCRF 50 may thus determine that the mobile terminal is roaming by the fact that specified V-PLMN ID is a roaming carrier's PLMN ID. Further, the home carrier PCRF 50 may read the roaming carrier cell-site identifier from the DIAMETER message and may perform a lookup in the coverage data discussed above, to determine whether the roaming carrier cell site serving the mobile terminal is threshold close to home carrier coverage.

If the home carrier PCRF 50 thereby determines that the mobile terminal is being served by a roaming carrier cell site that is threshold close to home carrier coverage, then the home carrier PCRF 50 may responsively send to the home carrier PGW a DIAMETER message that directs the home carrier PGW 46 to assign to the mobile terminal an IP address that the home carrier PGW 46 is configured to block. And the home carrier PGW 46 may do so, assigning an IP address from a pool of IP addresses that the home carrier PGW 46 is configured to block. Further, as with the process above, this is to be distinguished from a situation where a mobile terminal seeks access via a home carrier base station or via a roaming carrier base station that is not threshold close to home coverage, in which case the home carrier PGW 46 may instead assign an IP address from a default pool of IP addresses.

Thus, here as in the above process, in response to determining that the mobile terminal is being served by a roaming carrier cell site and that the roaming carrier cell site is located within a threshold distance of home carrier coverage (e.g., of a base station or of base station coverage provided by the home carrier), the home carrier may assign to the mobile terminal an IP address that the home carrier is configured to block, and the home carrier may accordingly block data communication to and/or from that IP address. And again, advantageously, the mobile terminal would thus still be able to be served by the roaming carrier, but the home carrier could prevent IP communication to and from the mobile terminal during that service.

Figure 4:
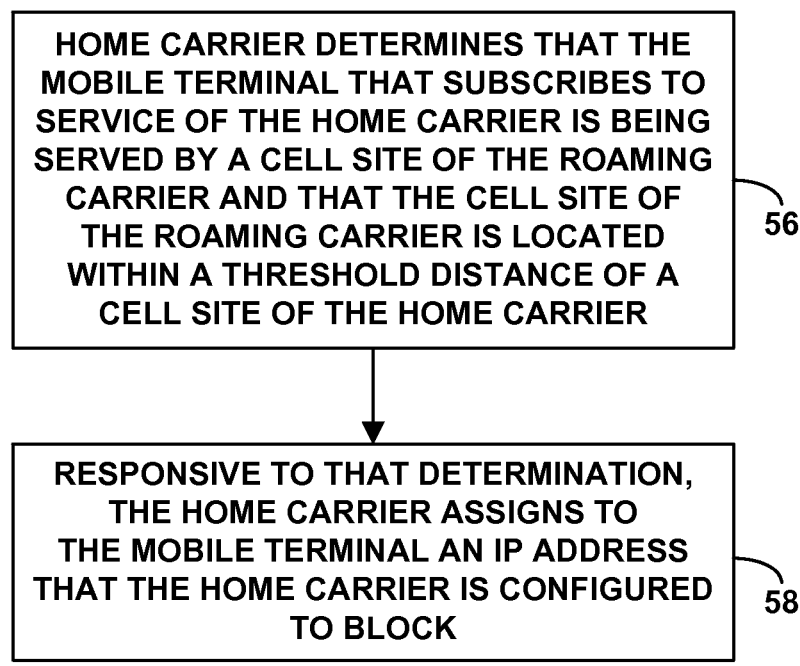
FIG. 4 is a flow chart depicting example operations in accordance with the disclosure.

FIG. 4 is next a flow chart depicting operations that can be carried out in an example implementation of this process, to limit data service for a mobile terminal that subscribes to service of a home carrier but that is served by a roaming carrier while near coverage provided the home carrier. As shown in FIG. 4, at block 56, the home carrier determines that the mobile terminal that subscribes to service of the home carrier is being served by a cell site of the roaming carrier and that the cell site of the roaming carrier is located within a threshold distance of a cell site of the home carrier. And at block 58, responsive to that determination, the home carrier assigns to the mobile terminal an IP address that the home carrier is configured to block. Thus, the IP address to the mobile terminal facilitates the mobile terminal being served by the roaming carrier, while assignment to the mobile terminal of the IP address that the home carrier is configured to block enables the home carrier to prevent IP communication to and from the mobile terminal while the mobile terminal is served by the roaming carrier.

In line with the discussion above, this process can be triggered by the home carrier server (e.g., AAA server or PCRF) receiving a signaling message indicative of attachment by the mobile terminal with the roaming carrier's cell site (e.g., a message that indicates the mobile terminal is so attached or is attaching or the like). Thus, the determining step can occur in response to receiving that signaling message (e.g., as a result of receiving that signaling message). And as discussed above, the signaling message could include an identifier of the roaming carrier, and determining that the mobile terminal is being served by the roaming carrier's cell site can then be based on the included identifier of the roaming carrier. Further, signaling message could include an identifier of the roaming carrier's cell site, and determining that the roaming carrier's cell site is located within the threshold distance of a cell site of the home carrier can then be based on the included identifier of the roaming carrier's cell site.

Figure 5:
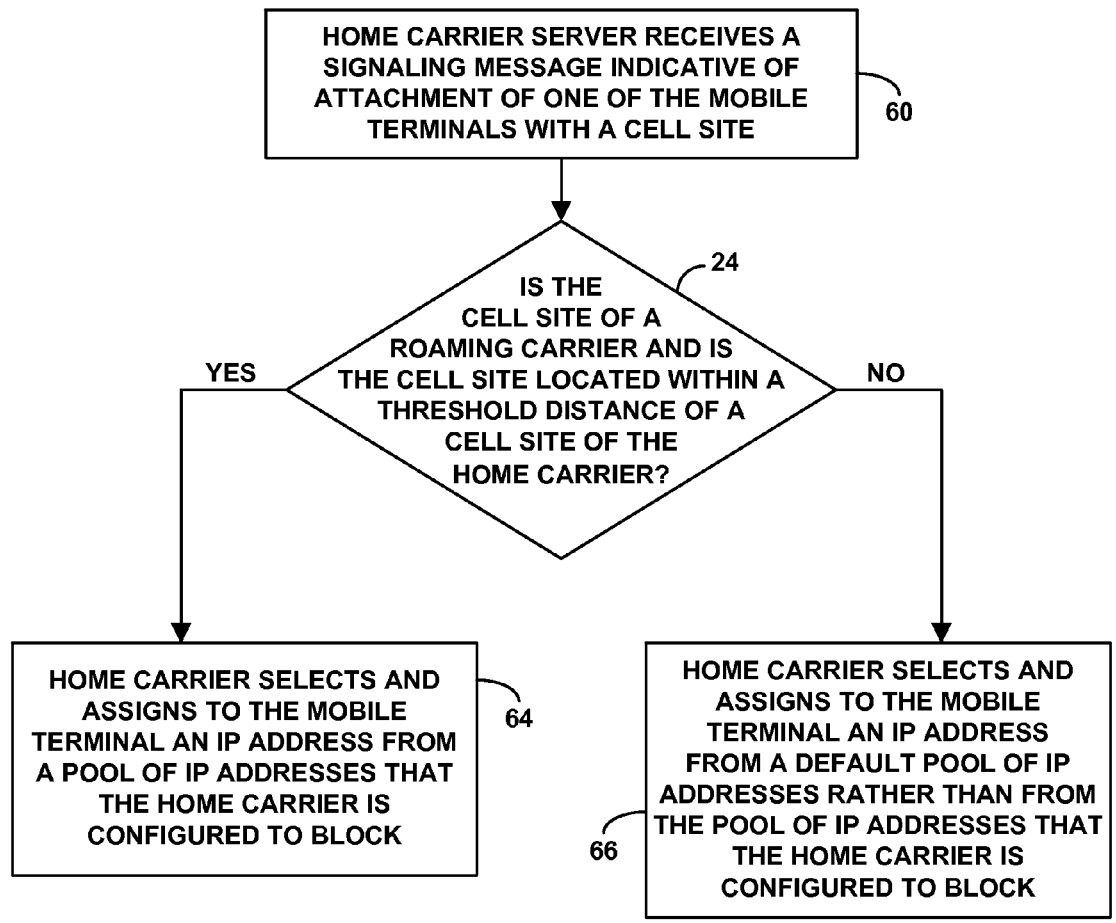
FIG. 5 is another flow chart depicting example operations in accordance with the disclosure.

FIG. 5 is next a flow chart depicting operations that can be carried out in another example implementation of this process, to control data service for mobile terminals that subscribe to service of a home carrier. As shown in FIG. 5, at block 60 a home carrier server receives a signaling message indicative of attachment of one of the mobile terminals with a cell site. At block 62, the home carrier server then responsively makes a determination of whether (i) the cell site is of a roaming carrier rather than of the home carrier and (ii) the cell site is located within a threshold distance of a cell site of the home carrier. And based on the determination, the home carrier selects and assigns to the mobile terminal an IP address. In particular, if the determination is affirmative, then, at block 64, the home carrier selects and assigns to the mobile terminal an IP address from a pool of IP addresses that the home carrier is configured to block. But if the determination is negative, then, at block 66, the home carrier selects and assigns to the mobile terminal an IP address from a default pool of IP addresses rather than from the pool of IP addresses that the home carrier is configured to block.

Figure 6:
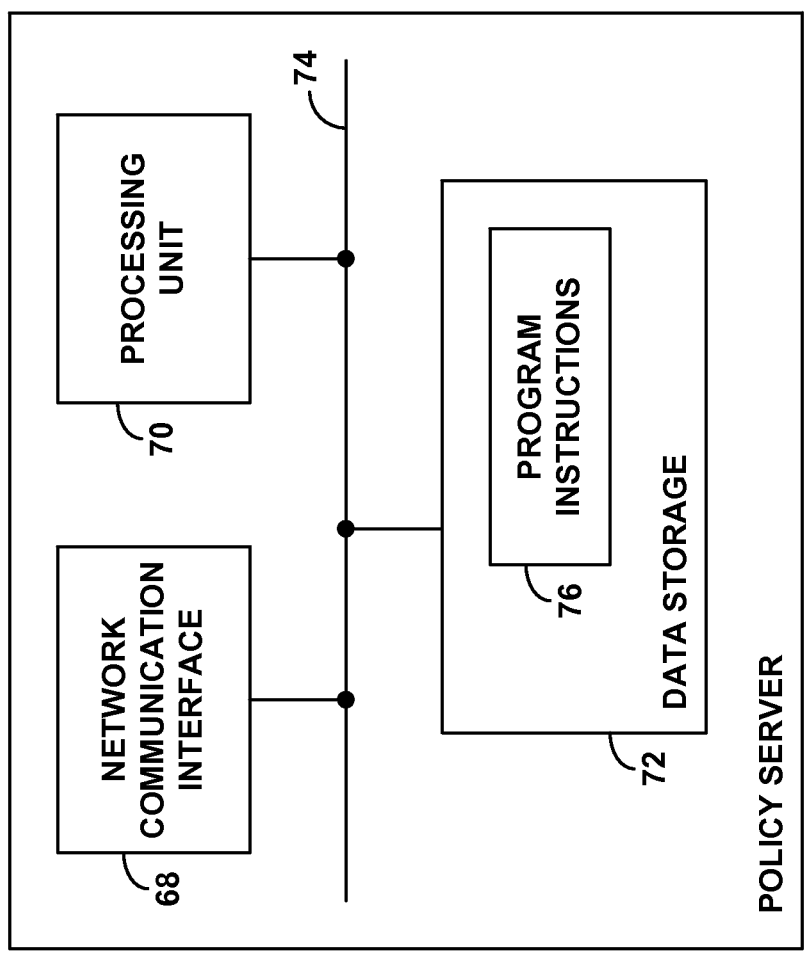
FIG. 6 is a simplified block diagram of an example policy server operable in accordance with the disclosure.

Finally, FIG. 6 is a simplified block diagram of a policy server depicting some of the components that such an entity can include in an example implementation, to control data service for mobile terminals that subscribe to service of a home carrier. As shown, the example policy server includes a network communication interface 68 a processing unit 70, and data storage 72, all of which may be communicatively linked together by a system bus, network, or other connection mechanism 74.

Network communication interface 68 may comprise an Ethernet or other type of network interface for engaging in communication with various other entities as discussed above. Processing unit 70 may then comprise one or more general purpose or special purpose processors (e.g., microprocessors or digital signal processors). And data storage 72 may comprise one or more volatile and/or non-volatile non-transitory storage components, such as magnetic, optical, or flash storage, and may be integrated in whole or in part with processing unit 70.

As further shown, data storage 70 then holds program instructions 76 (e.g., machine language instructions or the like), which may be executable by processing unit 70 to carry out various operations as described above. For example, the operations may include receiving via the network communication interface 68 a signaling message indicative of attachment of one of the mobile terminals with a cell site. Further, the operations may include, responsive to the signaling message, making a determination of whether (i) the cell site is of a roaming carrier rather than of the home carrier and (ii) the cell site is located within a threshold distance of a cell site of the home carrier. And the operations may include, based on the determination, causing the home carrier to select and assign to the mobile terminal an Internet Protocol (IP) address in the manner discussed above.

Exemplary embodiments have been described above. Those skilled in the art will understand, however, that changes and modifications may be made to these embodiments without departing from the true scope and spirit of the invention.

We claim:

1. A method of limiting data service for a mobile terminal that subscribes to service of a home carrier but that is served by a roaming carrier while near coverage provided the home carrier, the method comprising:
    making a determination by the home carrier of whether the mobile terminal that subscribes to service of the home carrier is being served by a cell site of the roaming carrier and the cell site of the roaming carrier is located within a threshold distance of a cell site of the home carrier;
    if the determination is affirmative, then assigning by the home carrier to the mobile terminal an Internet Protocol (IP) address that the home carrier is configured to block, whereby assignment of the IP address to the mobile terminal facilitates the mobile terminal being served by the roaming carrier, while assignment to the mobile terminal of the IP address that the home carrier is configured to block enables the home carrier to prevent IP communication to and from the mobile terminal while the mobile terminal is served by the roaming carrier; and
    if the determination is negative, then the assigning by the home carrier to the mobile terminal an IP address that the home carrier is not configured to block.

2. The method of claim 1, further comprising receiving into a home carrier server a signaling message indicative of attachment by the mobile terminal with the roaming carrier's cell site, wherein the determining occurs in response to receiving the signaling message.

3. The method of claim 2, wherein the signaling message includes an identifier of the roaming carrier, and wherein determining that the mobile terminal is being served by the roaming carrier's cell site is based on the included identifier of the roaming carrier.

4. The method of claim 2, wherein the signaling message includes an identifier of the roaming carrier's cell site, and wherein determining that the roaming carrier's cell site is located within the threshold distance of a cell site of the home carrier is based on the included identifier of the roaming carrier's cell site.

5. The method of claim 4, wherein the home carrier server has access to data that indicates respectively for each of a plurality of roaming carrier cell sites whether the roaming carrier cell site is within the threshold distance of an access network of the home carrier, and wherein determining that the roaming carrier's cell site is located within the threshold distance of a cell site of the home carrier is based on reference to the data.

6. The method of claim 5, wherein the threshold distance is between 1 mile and 5 miles.

7. The method of claim 5, wherein the data indicates respectively for each of a plurality of roaming carrier cell sites whether the roaming carrier cell site is within the threshold distance of a cell site of the home carrier by specifying (i) geographic location respectively of each of the roaming carrier cell sites and (ii) geographic location of one or more home carrier cell sites, and wherein determining that the roaming carrier cell site is located within the threshold distance of a cell site of the home carrier comprises:
    determining based on the data whether the geographic location of the roaming carrier cell site identified in the signaling message is within the threshold distance of the geographic location of the one or more home carrier cell sites.

8. The method of claim 2, wherein the home carrier server is a policy and charging rules function (PCRF), and wherein the signaling message is a create_session request provided to the PCRF from a packet data network gateway (PGW) of the home carrier in response to a create_session request that the PGW receives from a serving gateway (SGW) of the roaming carrier when the mobile terminal seeks to attach with the roaming carrier's cell site.

9. The method of claim 8, wherein assigning to the mobile terminal the IP address that the home carrier is configured to block comprises the PCRF directing the PGW to assign to the mobile terminal an IP address that the PGW is configured to block, wherein the PGW responds to the directing by assigning to the mobile terminal an IP address that the PGW is configured to block, the method further comprising the PGW then blocking communication to or from the assigned IP address.

10. The method of claim 9, wherein the PGW has access to a pool of IP addresses that the PGW is configured to block, wherein directing the PGW to assign to the mobile terminal the IP address that the PGW is configured to block comprises directing the PGW to assign to the mobile terminal an IP address selected from the pool, and wherein assigning to the mobile terminal the IP address that the PGW is configured to block comprises (i) selecting an IP address from the pool, and (ii) assigning the selected IP address to the mobile terminal.

11. The method of claim 2, wherein the home carrier server is an authentication, authorization, and accounting (AAA) server, and wherein the signaling message is received from a packet data serving node (PDSN) when the mobile terminal seeks to attach with the roaming carrier's cell site.

12. The method of claim 11, wherein the AAA server is an AAA server specifically in place to serve one or more roaming carrier networks, wherein determining that the mobile terminal is being served by a cell site of the roaming carrier is based on the AAA server being the home carrier server that receives the signaling message.

13. The method of claim 11, wherein assigning to the mobile terminal the IP address that the home carrier is configured to block comprises the AAA server directing a Mobile-IP home agent to assign to the mobile terminal an IP address that the home agent is configured to block, wherein the home agent responds to the directing by assigning to the mobile terminal an IP address that the home agent is configured to block, the method further comprising the home agent then blocking communication to or from the assigned IP address.

14. The method of claim 13, further comprising receiving into the home agent a Mobile-IP registration request from the mobile terminal, wherein assigning to the mobile terminal the IP address that the home agent is configured to block comprises specifying to the mobile terminal, in a response to the Mobile IP registration request, the assigned IP address that the home agent is configured to block.

15. The method of claim 13, wherein the home agent has access to a pool of IP addresses that the home agent is configured to block, wherein directing the home agent to assign to the mobile terminal the IP address that the home agent is configured to block comprises directing the home agent to assign to the mobile terminal an IP address selected from the pool, and wherein assigning to the mobile terminal the IP address that the home agent is configured to block comprises (i) selecting an IP address from the pool, and (ii) assigning the selected IP address to the mobile terminal.

16. A method of controlling data service for mobile terminals that subscribe to service of a home carrier, the method comprising:

receiving into a home carrier server a signaling message indicative of attachment of one of the mobile terminals with a cell site;

responsive to the signaling message, making a determination by the home carrier server of whether (i) the cell site is of a roaming carrier rather than of the home carrier and (ii) the cell site is located within a threshold distance of a cell site of the home carrier;

based on the determination, the home carrier selecting and assigning to the mobile terminal an Internet Protocol (IP) address, wherein if the determination is affirmative, then the home carrier selects and assigns to the mobile terminal an IP address from a pool of IP addresses that the home carrier is configured to block, but if the determination is negative, then the home carrier selects and assigns to the mobile terminal an IP address from a default pool of IP addresses rather than from the pool of IP addresses that the home carrier is configured to block.

17. The method of claim 16, wherein the home carrier server is a policy and charging rules function (PCRF), and wherein assigning to the mobile terminal the IP address that the home carrier is configured to block comprises the PCRF directing a home carrier packet data network gateway (PGW) to assign to the mobile terminal an IP address that the PGW is configured to block, wherein the PGW responds to the directing by assigning to the mobile terminal an IP address that the PGW is configured to block, the method further comprising the PGW then blocking communication to or from the assigned IP address.

18. The method of claim 16, wherein the home carrier server an authentication, authorization, and accounting (AAA) server, and wherein assigning to the mobile terminal the IP address that the home carrier is configured to block comprises the AAA server directing a Mobile-IP home agent to assign to the mobile terminal an IP address that the home agent is configured to block, wherein the home agent responds to the directing by assigning to the mobile terminal an IP address that the home agent is configured to block, the method further comprising the home agent then blocking communication to or from the assigned IP address.

19. A policy server configured to control data service for mobile terminals that subscribe to service of a home carrier, the policy server comprising:

a network communication interface;

a processing unit;

data storage; and program instructions stored in the data storage and executable by the processing unit to carry out operations comprising:

receiving via the network communication interface a signaling message indicative of attachment of one of the mobile terminals with a cell site, responsive to the signaling message, making a determination of whether (i) the cell site is of a roaming carrier rather than of the home carrier and (ii) the cell site is located within a threshold distance of a cell site of the home carrier, and based on the determination, causing the home carrier to select and assign to the mobile terminal an Internet Protocol (IP) address, wherein if the determination is affirmative, then the IP address is selected from a pool of IP addresses that the home carrier is configured to block, but if the determination is negative, then the IP address is selected from a default pool of IP addresses rather than from the pool of IP addresses that the home carrier is configured to block.

20. The policy server of claim 19, wherein the policy server is selected from the group consisting of a policy and charging rules function (PCRF) and an authentication, authorization, and accounting (AAA) server.

* * * * *